United States Patent
Silvia

[15] 3,698,251
[45] Oct. 17, 1972

[54] THRUST RETAINER FOR SPHERICAL RACE BALL BEARINGS

[72] Inventor: Everett R. Silvia, Huntington Station, N.Y.

[73] Assignee: AMBAC Industries, Inc., Garden City, N.Y.

[22] Filed: Aug. 12, 1971

[21] Appl. No.: 171,203

[52] U.S. Cl. .................. 74/5 R, 308/35, 308/194
[51] Int. Cl. .................. G01c 19/16, F16c 31/06
[58] Field of Search .............. 74/5 R; 308/35, 194

[56] References Cited

UNITED STATES PATENTS

| | | | |
|---|---|---|---|
| 3,126,231 | 3/1964 | Herr | 308/35 |
| 3,082,629 | 3/1963 | Jones, Jr. et al. | 74/5 X |
| 3,505,881 | 4/1970 | Varner | 74/5 |
| 2,704,695 | 3/1955 | Ricefield | 308/194 |
| 3,499,333 | 3/1970 | Abel | 74/5 X |
| 2,725,750 | 12/1955 | Togstad | 74/5 X |

*Primary Examiner*—Manuel A. Antonakas
*Attorney*—Dexter N. Shaw, Charles H. Howson, Jr., John W. Logan, Jr., Henry Howson Stillman, John C. Dorfman, Gordon S. Rogers, Charles M. Allen, Albert L. Free, Eugene E. Renz, Jr., Richard D. Weber and Roger W. Herrell

[57] ABSTRACT

A spherical bearing assembly for gyroscopes and the like including means for minimizing the frictional effects on the ball retainer of acceleration forces. Said means includes a thrust plate on the outer bearing race having an inner spherical surface concentric with the spherical bearing surfaces and centered on the axis of rotation of the outer bearing race. An axially centered spherical portion of the retainer having a radius less than that of the spherical surface of the thrust plate is adapted to cooperatively engage the thrust plate spherical surface to transmit thereto axial components of the thrust forces substantially along the axis of rotation of the outer race. For minimizing frictional thrust forces in both axial directions, an inner face of the retainer is adapted to cooperatively engage a spherical surface of the inner ball race assembly concentric with the spherical bearing surfaces at a point on or closely adjacent the axis of rotation of the outer race.

13 Claims, 8 Drawing Figures

PATENTED OCT 17 1972

THRUST RETAINER FOR SPHERICAL RACE BALL BEARINGS

BACKGROUND OF INVENTION

A gyroscope is classically considered to be a spinning mass or rotor supported in such manner that the spin axis of the rotor can turn freely and without restraint at least about one axis perpendicular to the spin axis, and generally about either or both of two mutually orthogonal axes each perpendicular to the spin axis.

It has been common practice in the prior art to provide such non-restraining support for the spinning rotor by means of a low-friction spin bearing which supports the gyro rotor for rotation about its spin axis, and by means of a gimbal structure for supporting the spin bearing. For example, the spin bearing structure may itself be pivotably supported on an inner gimbal to permit tilting of the spin axis about a first axis orthogonal to the spin axis, and the inner gimbal may be supported in turn on an outer gimbal having suitable bearings permitting rotation of the inner gimbal with respect to the outer gimbal about a second axis orthogonal to the first axis and to the spin axis.

More recently there has been developed a type of gyro rotor support in which the spin axis bearing and the gimbal bearings permitting rotation of the spin axis about two other mutually orthogonal axes are combined into a single spherical-race ball bearing assembly. This has been accomplished by affixing the gyro rotor to an outer race having an inner spherical bearing surface, and supporting the outer race on an inner spherical support concentric with the outer spherical surface by means of balls which contact the outer spherical surface of the inner support and the inner spherical surface of the outer race in rolling relation thereto. A ball retainer is also provided to fix the relative positions or spacings of the balls with respect to each other. In this type of bearing, the support arrangement not only permits the rotor to be spun at a high rate about its spin axis, but also permits free rotation of the spin axis about the other two mutually orthogonal axes.

When the gyro rotor support is to be subjected to substantial accelerative forces transverse to the plane of spin of the gyro rotor, there is a tendency for the ball retainer to be forced against an inner surface of the outer race structure due to inertial forces. Such accelerative forces may become quite large, for example in applications in which the gyroscope is utilized for the guidance of a missile or space vehicle or the like, which is rapidly accelerated during takeoff.

As will be described hereinafter in detail, it is known in the prior art to provide a thrust retainer arrangement for accommodating such forces, in the form of a thrust retaining bearing surface provided near the periphery of the retainer and adapted to engage a corresponding bearing surface affixed to the outer race, thereby to provide the desired thrust-retaining action. However, it has been found that the above-mentioned substantial accelerative forces produce frictional restraints against spinning of the gyro rotor which are substantially greater than would be expected merely from a consideration of the inertial forces involved. The frictional forces under such conditions in fact become so large as to produce a undesirable drag on the spinning of the gyro rotor, resulting in a slowing of the rate of spin during linear acceleration of the rotor support. Particularly in missile guidance systems where the gyro rotor is rotationally accelerated at launch and then allowed to "coast" after launching, such deceleration forces due to friction may in fact slow down the rotor sufficiently to alter its gyroscopic properties. I have investigated the reasons for this greater than expected frictional restraint, and as is described more fully hereinafter, it is believed that this additional restraint is caused by an effect which I have designated as "ball-twist effect." In any event, regardless of the exact reasons, it has been found that a spherical bearing of the above described type having conventionally disposed and constructed thrust retaining bearing surfaces produces undesirably large frictional restraining forces about the spin axis when the gyroscope is accelerated translationally in a direction transverse to the spin plane.

Accordingly it is a first object of the invention to provide a new and useful bearing structure.

A further object of the invention is to provide such a new bearing structure which provides support for a spinning mass with reduced frictional restraints on such spinning.

An additional object is to provide such a new bearing structure which also permits substantially free variation in the direction of the spin axis of the rotating mass.

Another object is to provide a new and useful form of gyroscope.

A further object is to provide an improved form of spherical support bearing for a gyroscope rotor.

Another object is to provide an improved spherical support bearing in which frictional restraints about the spin axis produced in response to accelerative forces having components transverse to the plane of spin of the rotor are substantially reduced.

Additional objects and advantages of the invention will be more readily apparent from the detailed description of embodiments of the invention set forth below.

SUMMARY OF THE INVENTION

In accordance with the invention, there is provided a spherical bearing assembly, suitable for example to support a gyroscope rotor, which includes a conventional arrangement of an inner race having a spherical surface connected to a stationary support means and an outer race having an inner spherical surface rotatably disposed about the inner race by means of rows of ball bearings retained in the proper spaced alignment by means of a retainer having a plurality of spaced holes within which the balls are held captive. The present invention provides means for minimizing the frictional restraint on rotation of the outer race about the inner race caused during acceleration of the assembly in a direction transverse to the plane of rotation of the outer race. The frictional forces may result from the inertial forces of the retainer and balls as well as from substantial axis forces due to the heretofore unrecognized "ball-twist effect" more particularly described below.

In its simplest form, the invention includes a thrust plate attached to the outer bearing race and having an inner spherical surface concentric with the spherical ball bearing surfaces and centered on the axis of rotation of the outer bearing race. An axially centered spherical portion of the retainer having a radius less than that of the thrust plate spherical surface cooperatively engages the thrust plate spherical surface cooperatively engages the thrust plate spherical surface to transmit thrust forces thereto substantially along the axis of rotation of the outer race. Since the point of engagement lies substantially on the outer race axis, the restraining effect on outer race rotation is minimal. In a modified embodiment of the invention, which accommodates components of thrust in either axial direction, an inner face of the retainer is adapted to cooperatively engage a spherical surface of the inner race assembly concentric with the spherical bearing surfaces and located on or closely adjacent the axis of rotation of the outer race. This arrangement similarly transmits the thrust forces, due either to inertial acceleration effects or to the ball-twist effect, along the axis of rotation of the assembly, thereby minimizing the restraining effect on the outer race rotation.

DESCRIPTION OF THE PREFERRED EMBODIMENTS

Figure 1:
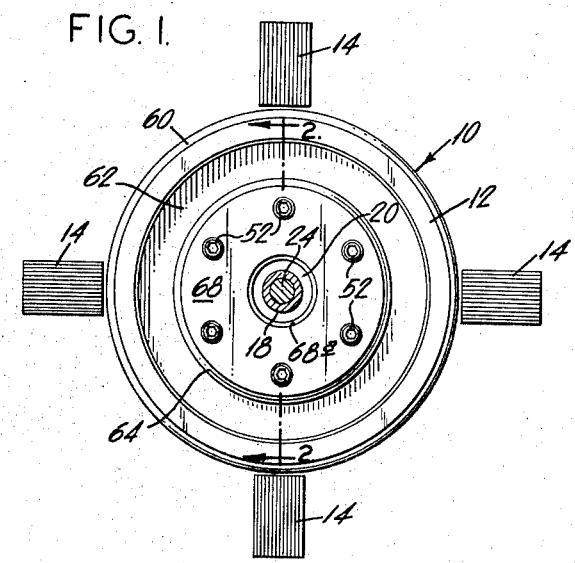
FIG. 1 is a partly schematic end elevational view of a gyroscope rotor and bearing assembly incorporating the improvement of the present invention.

Referring to the drawings, FIG. 1 shows in partly schematic form a gyroscope assembly generally designated 10, the rotor 12 of which is rotatably supported on a spherical bearing assembly in accordance with the present invention. Coils 14 spaced at 90° intervals around the circumference of the rotor are electromagnetic pick-off devices which provide an electrical signal proportional to the angular position of the rotor about two axes orthogonal to the spin axis. The rotor is driven up to speed by a retractable drive shaft with a forked end that engages holes in the rotor (not shown).

Figure 2:
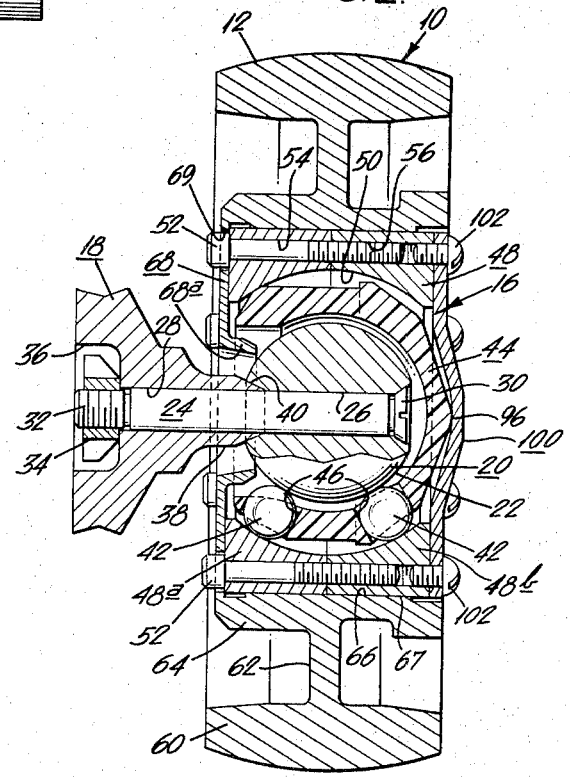
FIG. 2 is an enlarged sectional view taken along line 2—2 of FIG. 1 showing the details of the improved spherical bearing assembly.

Referring to FIG. 2, the details of the spherical bearing assembly generally designated 16 are illustrated. The rotor and bearing assembly are carried by a support means 18, the bearing assembly permitting the rotation of the rotor 10 in a preselected inertial plane unaffected (within limits) by changes in attitude of the support means. Should the gyroscope be mounted on a vehicle such as a missile for guidance purposes, the support means 18 would normally be secured to or comprise a part of the vehicle.

The bearing assembly 16 includes an inner race 20 having a spherical outer surface 22. The inner race is secured to the support means 18 by a bearing support rod 24 passing through a diametric bore 26 in the inner race and a bore 28 in the support means 18. A conical slotted head 30 at one end of the support rod 24 seats within a similarly tapered end of the bore 26 of the inner race. The opposite end 32 of the support rod is threaded to receive a nut 34 housed within a cavity 36 of the support means 18. A neck portion 38 of the support means 18 extends coaxially with the support rod, the tip 40 thereof defining a conical face cooperating with a similar conical seat in the inner race. The tightening of the nut 34 accordingly secures the inner race 20 to the support means 18 in a manner permits a maximum utilization of the spherical bearing surface 22.

A plurality of bearing balls 42 are arranged on the spherical surface 22 in two parallel annular rows by a retainer 44 which includes a plurality of equally spaced ball holes 46 to maintain the alignment and equal spacing of the ball bearings in each row while permitting rolling movement of the balls. The details of the retainer structure comprise an important part of the present invention and are thoroughly described and compared with the conventional prior art retainer structure herebelow.

An outer bearing race 48 includes a spherical inner surface 50 of a diameter chosen to provide rolling contact with the balls 42 extending through the holes 46 in the retainer, the balls 42 serving to position the outer race 48 concentrically with respect to the inner race 20 for any attitude of the rotor with respect to the support means. In the illustrated embodiment, the outer race comprises a pair of outer race elements 48a and 48b which are joined along diametrically opposed faces by a plurality of bolts 52 each of which passes through a transverse bore 54 in the element 48a and is threadedly engaged with a threaded bore 56 in the element 48b.

The rotor 12 is characterized by a relatively thick outer flange 60 connected by radial web portion 62 to an inner flange portion 64. The rotor is secured to the outer race 48 with the inner cylindrical surface 66 thereof engaging the outer cylindrical surface 67 of the outer race 48. A radially inwardly extending portion 68 of the rotor along one side thereof terminates in a neck portion 68a adjacent the inner race 20. Holes 69 in the portion 68 allow free passage of the bolts 52.

Figure 3:
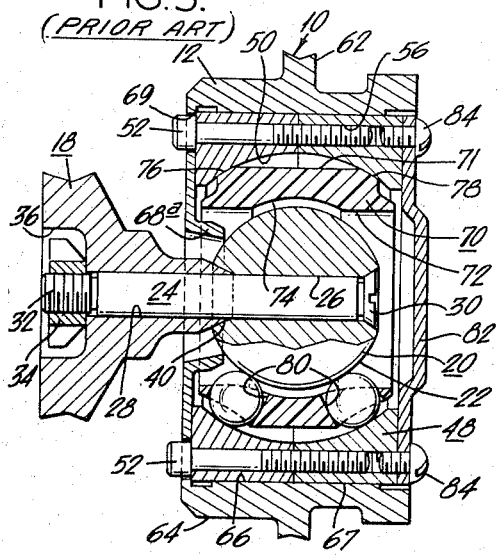
FIG. 3 is a partial sectional view similar to that of FIG. 2 showing the prior art spherical bearing construction.
Figure 4:
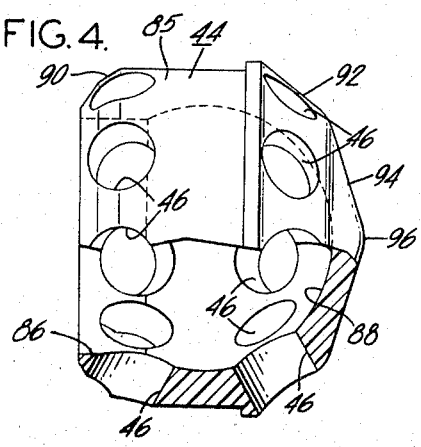
FIG. 4 is an enlarged view partly broken away and in section of the retainer of the bearing assembly shown in FIG. 2.
Figure 5:
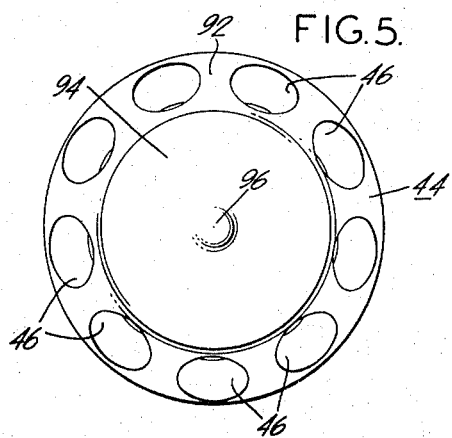
FIG. 5 is an end elevational view of the retainer shown in FIG. 4.

The details of the spherical bearing assembly described thus far are conventional, and therefore the structural elements specifically identified by number with the exception of the retainer 44 are common to both the prior-art structure shown in FIG. 3 as well as the present improvement shown in FIGS. 1 and 2. The structural distinctions and the functional advantages of the present device can best be understood by first considering the structure and operational shortcomings of the prior art bearing assembly, particularly when subjected to acceleration forces transverse to the plane of rotation of the rotor.

As shown in FIG. 3, the conventional prior art bearing assembly includes a retainer 70 characterized by a cylindrical outer surface 71 and a coaxial inner cylindrical surface 72, the latter surface being interrupted by a centrally located circumferential spherical surface 74 which accommodates the inner race 20 and is concentric therewith in spaced relation thereto. The cylindrical surface 71 at each side of the retainer adjoins annular spherical surfaces 76 and 78 concentric with and in sliding engagement with the spherical surface 50 of the outer race. The surfaces 76 and 78 are interrupted by the ball holes 80 as illustrated and serve to maintain a concentric position of the retainer with respect to the inner and outer race spherical surfaces. A cover plate 82 on the opposite side of the outer race from the support means 18 is secured thereto by screws 84 extending into the threaded bores 56.

During operation of the prior art device, the rotor is driven in rotation by an external retractable drive shaft and then coasts during operation, the outer race 48 rotating with the rotor about the inner race 20. The outer race is journaled with respect to the inner race by the balls 42 in a well known manner. In view of the spherical surfaces of the inner and outer races, the plane of rotation of the rotor will remain constant due to its rotational inertia despite changes in attitude of the support means 18.

While the prior art bearing structure has proved generally adequate for applications in which the unit is not subjected to accelerations transverse to the plane of rotor rotation, for uses such as in missile guidance systems which are subject to such acceleration forces, the conventional construction illustrated in FIG. 3 has been found to produce unexpectedly high frictional drag on the spinning rotor.

Considering specifically the causes of the frictional forces, it can be understood that should the assembly shown in FIG. 3 be accelerated in a direction transverse to the plane of rotation of the rotor, the resultant inertial forces of the retainer and the balls in the opposite direction will be transmitted to the outer race spherical surface through one of the spherical surfaces 76 or 78 of the retainer. The significant frictional forces generated by the inertial forces of the retainer and balls will, in view of its application at a substantial radial distance from the axis of rotation of the rotor, exert a slowing effect on the rotor as well as induce precession torques which in the case of a gyroscope bearing could adversely influence the accuracy of the instrument.

The frictional forces developed by acceleration transverse to the plane of rotation of the rotor and transmitted by the spherical surfaces 76 and 78 of the retainer have been found to be much greater than can be attributable to the inertial resultant forces of the retainer and balls alone. The substantial additional force is believed to be largely due to a previously unrecognized phenomenon which I have termed "ball twist loading." In view of the complexity of the analysis of the causes and values of ball twist loading and the fact that it has not been possible to isolate this factor with certainty as being the sole additional cause of the unexpectedly large frictional forces, only a brief description of the ball twist effect will be presented.

Ball twist results from a small forward shift of the ball/race contact due to the inelasticity of the material of the balls and races. This deviation from ideal kinematics causes the balls to exert an axial force against the retainer which varies with axial race load, the inelasticity of the ball and race materials, and the coefficient of friction in the ball/race contact area.

Where both radial rows of balls are equally loaded, the axial ball twist force is equal and opposite on the retainer with a zero net force. An external loading, such as an acceleration transverse to the plane of rotation of the outer race, unbalances the loads on the ball rows, resulting in a net axial force on the retainer. Unless the bearing is designed to efficiently support this load, the ball twist force can cause the retainer to jam against its piloting surface producing a major increase in overall bearing friction torque.

Figure 6:
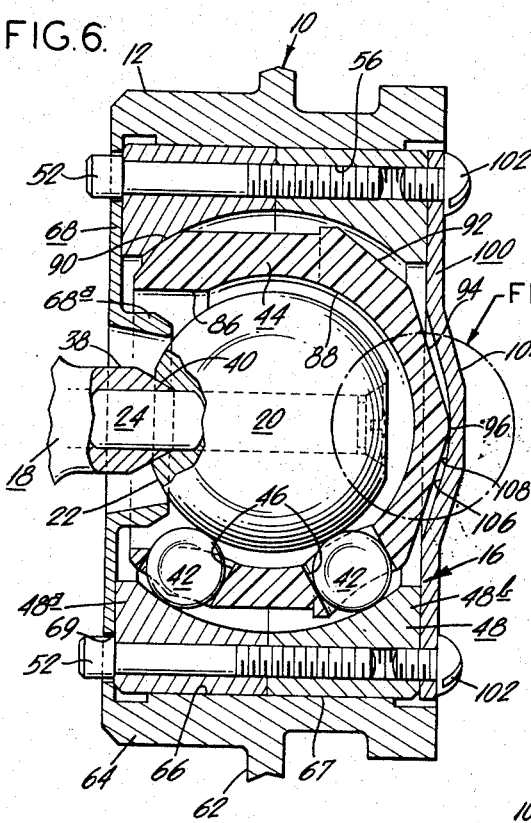
FIG. 6 is a enlarged sectional view similar to that shown in FIG. 2 of the improved bearing assembly.
Figure 7:
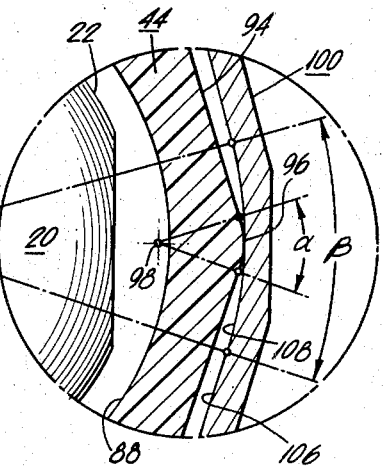
FIG. 7 is an enlarged view of the circled portion of FIG. 6.

Referring to FIG. 2 and the enlarged views of FIGS. 6 and 7, the novel retainer structure of the present invention which minimizes the effects of thrust forces on rotor rotation is illustrated. The retainer 44 is characterized by a coaxial cylindrical outer surface 85 and a coaxial cylindrical bore 86 opening into a spherical chamber 88 therewithin concentric with the inner race 20 with the walls thereof spaced from the spherical surface 22 of the inner race. An annular spherical piloting surface 90 of the retainer perpendicular to the retainer axis is located along that side of the retainer facing the support means 18 and is adapted to transmit thrust forces to the outer race in the axial direction toward the support means 18.

On the opposite side from the surface 90, the retainer is characterized by a conical surface 92 spaced from the spherical surface 50 of the outer race and which is interrupted by one of the rows of ball holes 46. A more acutely angled conical surface 94 adjoins the conical surface 92 and defines the end of the retainer. As shown in FIG. 7, a spherical surface 96 having a center 98 on the retainer axis forms the apex of the conical surface 94.

A thrust plate 100 radially secured to the outer race by bolts 102 extending into threaded bores 56, includes an axially symmetrical outwardly extending central portion 104. The inner surface of the thrust plate portion 104 comprises a conical surface 106 having a central spherical portion 108 centered about the axis of rotation of the outer race as shown most clearly in FIG. 7. The spherical surface 108 is as illustrated concentric with the center of the bearing assembly and is adapted for cooperative engagement by the spherical surface 96 of the retainer for the purpose of transmitting thrust forces from the retainer to the outer race at a point substantially on the axis of rotation of the outer race. It will be noted in FIG. 7 that although the angular extent $\alpha$ of the retainer spherical surface 96 is somewhat greater than the angular extent $\beta$ of the thrust plate surface 108, the retainer spherical surface is considerably smaller in view of its shorter radius which insures a point contact of the surfaces.

With the surface 108 centered at the axis of the outer race and with the surface 96 being located on the axis of the retainer, it will be apparent that the contact point of the surfaces will lie substantially along the axis of rotation of the outer race. Although the retainer 44 is free to rotate in any direction with respect to the outer race, the rotation about an axis parallel with the plane of rotation of the outer race is limited by the presence of the inwardly extending portion 68a of the rotor. The surface 96 of the retainer will thus always engage the spherical surface 108 of the thrust plate and at a point closely adjacent the outer race axis.

During operation, the present bearing assembly operates in a substantially conventional manner to provide a rotation of the rotor 10 under influence of the coils 14 about the support means 18. The outer race 48 to which the rotor is attached rotates on the balls 42 about the fixed inner race 20. In view of the spherical inner and outer race surfaces upon which the ball bearings ride, the angular relationship between the support means 18 and the outer race 48 may change within limits without disturbing the inertial plane of rotation of the rotor. The retainer 44 serves to maintain the balls at the proper spacing in the parallel rows.

In the event of an acceleration of the unit in a direction transverse to the plane of rotation of the rotor, and specifically an acceleration having an axial component toward the support means 18 (toward the left in FIG. 2), the resultant inertial force of the retainer and balls as well as the resultant ball twist force caused by the acceleration will include axial force components in the opposite direction from the acceleration. These resultant thrust forces with the present retainer structure will be carried by the thrust plate 100, being transmitted by the spherical retainer surface 96 bearing against the thrust plate spherical surface 108.

Because of the proximity of the contact point of these spherical surfaces to the axis of rotation of the outer race, the inertial and ball twist thrust forces will have a minimal slowing effect on the rotor rotation if they are directed toward the thrust plate 100. Thrust forces in the opposite direction are transmitted to the outer race through spherical surface 90 of the retainer in a manner similar to that of the prior art device of FIG. 3. The embodiment of FIGS. 1, 2 and 4–7 thus provides the advantages of the invention only in the case of accelerations of the device in a direction having an axial thrust component to the left as viewed in FIGS. 2 and 6.

Figure 8:
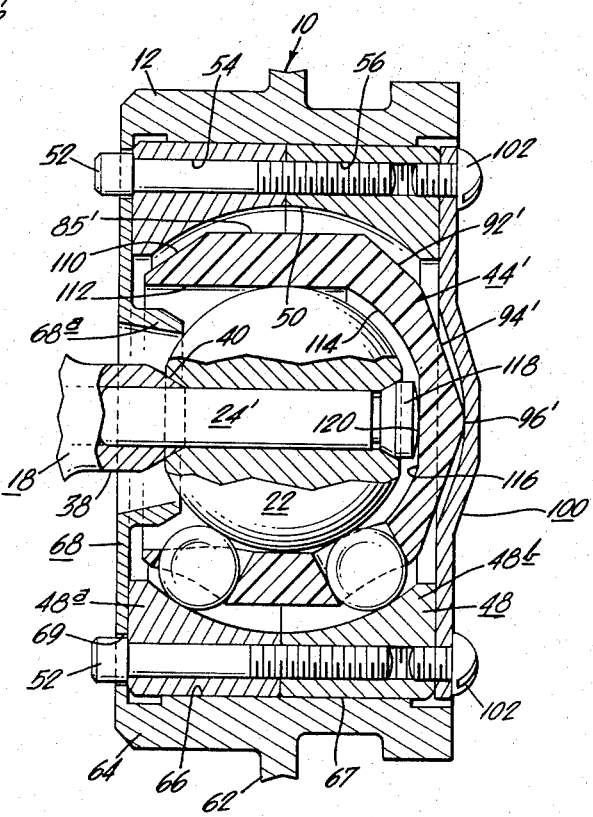
FIG. 8 is a sectional view similar to the view of FIG. 6 showing modified form of the invention.

The modified embodiment of FIG. 8 is adapted to minimize thrust effects on rotor rotation regardless of the direction of the accelerating force. The structure of this embodiment is identical with that of the preceding embodiment with the exception of the retainer and the support rod, and hence corresponding parts bear the same identifying numbers and require no further description.

The retainer 44' of the embodiment of FIG. 8 is similar to previously described retainer 44 in that it includes a coaxial cylindrical outer surface 85', conical surfaces 92' and 94', and spherical surface 96' which serve the same functions as their counterparts in retainer 44. At no point, however, does the retainer 44' contact the spherical surface 50 of the outer bearing race. A conical surface 110 spaced from the outer bearing race borders the cylindrical surface 85' at one side thereof in the region occupied by the spherical surface 90 in retainer 44 (FIG. 6).

A coaxial bore 112 in the retainer 44' is sized to accommodate the spherical surface 22 of the inner race to permit a sliding relation of the retainer about the inner race. The cooperation of spherical surface 22 and the wall of bore 112 provides the necessary radial positioning of the retainer 44' concentrically between the inner and outer races. At its inner end, the bore terminates in a spherical surface 114 which is interrupted by a planar radial surface 116 centered on the retainer axis.

The support rod 24' differs from rod 24 essentially in the shape of the head at the inner end thereof. Whereas the rod 24 included a slotted recessed end 30, the rod 24' is characterized by a head 118 extending axially beyond the inner race and terminating in a spherical surface 120 engaging the surface 116 of the retainer in sliding relation. The spherical surface 120 is concentric with the inner race spherical surface 22 and has a slightly larger radius than the inner race surface 22. Since the radius of the planar surface 116 is infinite, the radius of the spherical surface 120 of the support rod is smaller than that of the surface 116.

The operation of the FIG. 8 embodiment is similar to that described above. The retainer 44' is concentrically positioned by its engagement with the spherical surface of the inner race. The transmittal of inertial and ball twist thrust forces directed to the right as viewed in FIG. 8 takes place in the same manner as that described in connection with the preceding embodiment, the spherical surface 96' bearing against the adjacent spherical surface 108' of the thrust plate for this purpose.

Thrust forces in the opposite axial direction, namely to the left as viewed in FIG. 8, are transmitted from the retainer to the spherical surface 120 of the support rod 24' which is slidably engaged by the surface 116 of the retainer. Since this engagement and transmittal of thrust forces takes place substantially along the axis of the retainer, the frictional forces will have a minimal slowing effect on the rotation of the retainer and accordingly a minimal effect on the rotation of the outer race and rotor. The retainer 44' is of course free to rotate both in the plane of rotation of the rotor as well as about an axis parallel to the plane of rotation of the rotor within the limits established by the rotor portion 68. The improved construction of the invention thus does not, in either embodiment, in any way interfere with the normal movement of the outer race, retainer, or balls but serves to greatly reduce the effects on the outer race rotation of the thrust forces of the retainer and balls.

Manifestly, changes in details of construction can be effected by those skilled in the art without departing from the spirit and the scope of the invention.

I claim

1. In a spherical bearing assembly including an inner race having a spherical exterior bearing surface, an outer race having an inner spherical bearing surface concentric with and spaced from the bearing surface of said inner race, a plurality of ball bearings disposed between said inner and outer races in rolling bearing relation to the respective spherical surfaces thereof, and a ball retainer between said spherical surfaces adapted to maintain said ball bearings in a predetermined relatively spaced disposition, the improvement comprising thrust-retaining means secured to said outer race and having an inner bearing surface extending across the axis of rotation of said outer race, an outer bearing surface of said ball retainer extending across the axis of said retainer immediately adjacent said thrust plate surface and being adapted to bear against said thrust-retaining means surface to transmit thrust forces to said thrust-retaining means, one of said thrust-retaining means and retainer surfaces being a spherical surface concentric with said inner and outer race bearing surfaces.

2. In a spherical bearing assembly including an inner race having a spherical exterior bearing surface, an outer race having an inner spherical bearing surface concentric with and spaced from the bearing surface of said inner race, a plurality of ball bearings disposed between said inner and outer races in rolling bearing relation to the respective spherical surfaces thereof, and a ball retainer between said spherical surfaces adapted to maintain said ball bearings in a predetermined relatively spaced disposition, the improvement comprising thrust-retaining means secured to said outer race and having an inner spherical bearing surface concentric with the bearing surfaces of said inner and outer races and extending across the axis of rotation of said outer race, an outer bearing surface of said ball retainer being positioned to bear against said thrust-retaining means spherical surface to transmit thrust forces to said thrust-retaining means.

3. The invention as claimed in claim 2 wherein said outer bearing surface of said ball retainer comprises a spherical surface centered on the axis of rotation of said retainer and having a radius smaller than the radius of said thrust-retaining means spherical surface.

4. In a spherical bearing assembly including an inner race having a spherical exterior bearing surface, an outer race having an inner spherical bearing surface concentric with and spaced from the bearing surface of said inner race, a plurality of ball bearings disposed between said inner and outer races in rolling bearing relation to the respective spherical surfaces thereof, and a ball retainer between said spherical surfaces having an axis of rotation substantially coaxial with the axis of rotation of said outer race, said ball retainer being adapted to maintain said ball bearings in a pair of spaced parallel annular rows perpendicular to the retainer axis with the bearings in each row being maintained in a predetermined relatively spaced disposition, the improvement comprising a thrust plate secured to said outer race and having an inner spherical bearing surface concentric with the bearing surfaces of said inner and outer races and extending across the axis of rotation of said outer race, an outer bearing surface of said ball retainer being positioned to bear against said thrust plate spherical surface substantially on the axis of rotation of said outer race to transmit thrust forces to said thrust plate and hence said outer race.

5. The invention as claimed in claim 4 wherein said outer bearing surface of said ball retainer comprises a spherical surface centered on the axis of rotation of said retainer and having a radius smaller than the radius of said thrust-retaining means spherical surface.

6. In a spherical bearing assembly including an inner race having a spherical exterior bearing surface, an outer race having an inner spherical bearing surface concentric with and spaced from the bearing surface of said inner race, a plurality of ball bearings disposed between said inner and outer races in rolling bearing relation to the respective spherical surfaces thereof, and a ball retainer between said spherical surfaces adapted to maintain said ball bearings in a predetermined relatively spaced disposition, the improvement comprising means on said retainer for engagement with said inner race spherical surface to position said retainer concentrically between said inner race and said outer race spherical surfaces, thrust-retaining means secured to said outer race and having an inner bearing surface extending across the axis of rotation of said outer race, an outer bearing surface of said ball retainer extending across the axis of said retainer immediately adjacent said thrust plate surface and being adapted to bear against said thrust retaining means surface to transmit thrust forces to said thrust-retaining means, one of said thrust-retaining means and retainer surfaces being a spherical surface concentric with said inner and outer race bearing surfaces, a thrust-retaining surface associated with said inner race and extending across the axis of rotation of said outer race, an inner bearing surface of said ball retainer extending across the axis of said retainer immediately adjacent said inner race thrust retaining surface being adapted to bear against said thrust-retaining surface associated with said inner race to transmit thrust forces to said inner race, one of said inner race thrust-retaining surface and retainer inner bearing surface being a spherical surface concentric with said inner and outer race bearing surfaces.

7. The invention as claimed in claim 6 wherein said means on said retainer for engagement with said inner race spherical surface to position said retainer concentrically between said inner race and said outer race spherical surfaces comprises an axial bore in said retainer, the surface of said axial retainer bore being adapted to engage said inner race spherical surface.

8. In a spherical bearing assembly including an inner race having a spherical exterior bearing surface, an outer race having an inner spherical bearing surface concentric with and spaced from the bearing surface of said inner race, a plurality of ball bearings disposed between said inner and outer races in rolling bearing relation to the respective spherical surfaces thereof, and a ball retainer between said spherical surfaces having an axis of rotation substantially coaxial with the axis of rotation of said outer race, said ball retainer being adapted to maintain said ball bearings in a pair of spaced parallel annular rows perpendicular to the retainer axis with the bearings in each row being maintained in a predetermined relatively spaced disposition, the improvement comprising means on said retainer for engagement with said inner race spherical surface to position said retainer concentrically between said inner race and said outer race spherical surfaces, said means on said retainer comprising an axial bore in said retainer the surface of which is adapted to engage said inner race spherical surface, a thrust plate secured to said outer race and having an inner spherical bearing surface thereon extending across the axis of rotation of said outer race, an outer bearing surface of said ball retainer extending across the axis of said retainer immediately adjacent said thrust plate surface and being adapted to bear against said thrust plate spherical surface to transmit thrust forces to said outer race, a spherical thrust-retaining surface associated with said inner race and extending across the axis of rotation of said outer race, an inner bearing surface of said ball retainer extending across the axis of said retainer immediately adjacent said inner race thrust retaining surface being adapted to bear against said thrust-retaining surface of said inner race to transmit thrust forces to said inner race.

9. The invention as claimed in claim 8 including a support rod connected to said inner race for support thereof, said spherical thrust-retaining surface associated with said inner race being located on said support rod.

10. In a gyroscope comprising a rotor including a spherical bearing assembly for supporting said rotor in rotation about a support means, said bearing assembly including an inner race having a spherical exterior bearing surface, an outer race having a inner spherical bearing surface concentric with and spaced from the bearing surface of said inner race, said rotor being mounted on said outer race for rotation therewith, a plurality of ball bearings disposed between said inner and outer races in rolling bearing relation to the respective spherical surfaces thereof, and a ball retainer between said spherical surfaces adapted to maintain said ball bearings in a predetermined relatively spaced disposition, the improvement comprising thrust-retaining means secured to said outer race and having an inner bearing surface extending across the axis of rotation of said outer race, an outer bearing surface of said ball retainer extending across the axis of said retainer immediately adjacent said thrust plate surface and being adapted to bear against said thrust-retaining means surface to transmit thrust forces to said thrust-retaining means, one of said thrust-retaining means and retainer surfaces being a spherical surface concentric with said inner and outer race bearing surfaces.

11. In a gyroscope comprising a rotor including a spherical bearing assembly for supporting said rotor in rotation about a support means, said bearing assembly including an inner race having a spherical exterior bearing surface, an outer race having an inner spherical bearing surface concentric with and spaced from the bearing surface of said inner race, said rotor being mounted on said outer race for rotation therewith, a plurality of ball bearings disposed between said inner and outer races in rolling bearing relation to the respective spherical surfaces thereof, and a ball retainer between said spherical surfaces having an axis of rotation substantially coaxial with the axis of rotation of said outer race, said ball retainer being adapted to maintain said ball bearings in a pair of spaced parallel annular rows perpendicular to the retainer axis with the bearings in each row being maintained in a predetermined relatively spaced disposition, the improvement comprising a thrust plate secured to said outer race and having an inner spherical bearing surface concentric with the bearing surfaces of said inner and outer races and extending across the axis of rotation of said outer race, an outer bearing surface of said ball retainer being positioned to bear against said thrust plate spherical surface substantially on the axis of rotation of said outer race to transmit thrust forces to said thrust plate and hence said outer race.

12. The invention as claimed in claim 11 wherein said outer bearing surface of said ball retainer comprises a spherical surface centered on the axis of rotation of said retainer and having a radius smaller than the radius of said thrust-retaining means spherical surface.

13. In a gyroscope comprising a rotor including a spherical bearing assembly for supporting said rotor in rotation about a support means, said bearing assembly including an inner race having spherical exterior bearing surface, an outer race having an inner spherical bearing surface concentric with and spaced from the bearing surface of said inner race, said rotor being mounted on said outer race for rotation therewith, a plurality of ball bearings disposed between said inner and outer races in rolling bearing relation to the respective spherical surfaces thereof, and a ball retainer between said spherical surfaces adapted to maintain said ball bearings in a predetermined relatively spaced disposition, the improvement comprising means on said retainer for engagement with said inner race spherical surface to position said retainer concentrically between said inner race and said outer race spherical surfaces, thrust-retaining means secured to said outer race and having an inner bearing surface extending across the axis of rotation of said outer race, an outer bearing surface of said ball retainer extending across the axis of said retainer immediately adjacent said thrust plate surface and being adapted to bear against said thrust retaining means surface to transmit thrust forces to said thrust-retaining means, one of said thrust-retaining means and retainer surfaces being a spherical surface concentric with said inner and outer race bearing surfaces, a thrust-retaining surface associated with said inner race and extending across the axis of rotation of said outer race, an inner bearing surface of said ball retainer extending across the axis of said retainer immediately adjacent said inner race thrust retaining surface being adapted to bear against said thrust-retaining surface associated with said inner race to transmit thrust forces to said inner race, one of said inner race thrust-retaining surface and retainer inner bearing surface being a spherical surface concentric with said inner and outer race bearing surfaces.

* * * * *

UNITED STATES PATENT OFFICE
CERTIFICATE OF CORRECTION

Patent No. 3,698,251             Dated October 17, 1972

Inventor(s) Everett R. Silvia

It is certified that error appears in the above-identified patent and that said Letters Patent are hereby corrected as shown below:

Column 8, line 65, delete "plate" and insert --retaining means--

Column 10, line 8, delete "plate" and insert --retaining means--

Column 11, line 12, change "a" to --an--
line 26, delete "plate" and insert --retaining means--

Column 12, line 35, delete "plate" and insert --retaining means--

Signed and sealed this 29th day of May 1973.

(SEAL)
Attest:

EDWARD M. FLETCHER, JR.
Attesting Officer

ROBERT GOTTSCHALK
Commissioner of Patents